INVENTORS
PAUL R. SPENCER
SEYMOUR SALMIRS
ERNST F. GERMANN, JR.

INVENTORS
PAUL R. SPENCER
SEYMOUR SALMIRS
ERNST F. GERMANN, JR.

BY
ATTORNEYS

United States Patent Office 3,229,102
Patented Jan. 11, 1966

---

3,229,102
RADIATION DIRECTION DETECTOR INCLUDING MEANS FOR COMPENSATING FOR PHOTOCELL AGING
Paul R. Spencer, Houston, Tex., Seymour Salmirs, Hampton, Va., and Ernst F. Germann, Jr., Houston, Tex., assignors to the United States of America as represented by the Administrator of the National Aeronautics and Space Administration
Filed May 31, 1962, Ser. No. 199,202
6 Claims. (Cl. 250—203)
(Granted under Title 35, U.S. Code (1952), sec. 266)

The invention described herein may be manufactured and used by or for the Government of the United States of America for governmental purposes without the payment of any royalties thereon or therefor.

This invention relates generally to a radiation direction detector, and more particularly to a solar sensor for providing an electrical signal that is proportional to the angle of incidence between the solar disk and a reference axis on the sensor.

Present day space operations present numerous requirements for a solar orientation system. The wide range of space missions requiring solar orientation may be broadly placed in the two categories of solar applications and solar research. The applications would include solar energy converters such as parabolic reflecting concentrators and solar cell batteries, which may power either an entire space vehicle or a certain portion of one. In addition to providing an economical and accessible source of energy for a space operation of long-time duration, the solar disk is a convenient beacon for space navigation. Still another solar property which may some day be utilized is the solar radiation pressure, for which solar sails have been proposed as low-thrust vehicles.

Solar research projects which are of immediate concern would include a study of the solar energy spectrum in bands that are inaccessible below the Earth's atmosphere. In addition to satellite insolation measurement and control, a solar-oriented satellite could monitor the solar constant to furnish invaluable data for terrestrial heat balance studies. A solar-oriented telescope could yield information on sun spots, flares, and other aspects of the solar atmosphere.

A solar sensor, such as described herein, serves to orient missions in space by providing a space vehicle control system with an electrical signal that is proportional to the angle of incidence between the sun and a reference axis on the space vehicle to be oriented. The control system would then amplify this signal to obtain the magnitude and sense of reaction torque required for vehicle alignment with respect to the solar disk.

A few detectors, or sensors, have been designed previously, and although these existing designs are adequate for some types of solar applications, more stringent demands must be met in regard to prolonged reliability and pointing sensitivity. Consideration must also be given to other factors such as initial acquisition of the solar disk, endurance, weight, power consumption, economy, simplicity, and ease of fabrication.

One example of prior art is shown in U.S. Patent No. 2,969,018, wherein a photometrical system is utilized in conjunction with a homing missile. This exemplar patent may be seen to employ a plurality of photocells orthogonally arranged in a plane normal to the missile axis, optically shielded from each other by opaque sheets having a line of intersection coincident with the missile axis. The signals from the cells are compared and appropriate forces applied to the missile control surfaces to turn the missile toward the target line of sight. The radiation direction detector constituting the instant invention also utilizes a photometrical principle of operation; however, as will become evident hereinafter, the sensor of the present invention possesses an increased wide-angle capture capability and a higher fine or pointing sensitivity. The detector herein disclosed also eliminates the absolute necessity for shielding means as employed in the above cited homing system, together with the attendant design limitations in weight and bulk; although, shielding means are employed in alternative embodiments of the instant invention to further increase the fine pointing sensitivity.

Accordingly, it is an object of the present invention to provide a new and improved radiation direction detector.

Another object of the instant invention is to provide a novel detector having both a wide angle capture capability and a fine pointing sensitivity combined in a single unit.

A further object of the present invention is to provide a solar sensor in which the effects of reflected solar radiation from nearby planetary bodies are eliminated.

A still further object of the instant invention is to provide a sensor having a drift compensator for correcting errors which may occur after prolonged operation of the sensor due to asymmetrical aging of the sensor's transducing elements.

The foregoing and other significant objects are attained in the instant invention by the provision of a solar sensor wherein a plurality of planar photocells are positioned on a flat base, and inclined at large, equal angles thereto. The plurality of photocells are also equiangularly arranged about a reference axis extending perpendicularly to the sensor base. The basic principle of operation of the sensor is that the illumination of a flat surface is directly proportional to the cosine of the angle of incidence. Therefore, when the incident solar radiation is parallel to the sensor reference axis, the cells are equally illuminated and produce equal potentials if their electrical output signals are matched. The photocells are connected in a battery-bridge circuit for matching or comparing of the cell output signals. When the solar sensor is aligned toward the center of the solar disk, there will be no current through the center branch of the bridge, which provides the input signal to the control system of the vehicle. If, however, the incident radiation forms an angle with the sensor reference axis, then the more illuminated cell will produce an electrical signal through the center of the bridge; the signal will increase in intensity with increasing error angle and will reach a maximum when the incident radiation becomes perpendicular to the more illuminated cell.

The sensitivity of the sensor of the instant invention is significantly increased for small angles of incidence, through the addition of an opaque shield positioned between the plurality of planar photocells at the apex thereof, and extending parallel to the reference axis. The shadow cast by the opaque shield on the lesser illuminated photocell effects a significant gain in sensor precision for small angles between the sensor reference axis and the direction of solor radiation. Silicon solar cells are utilized as the planar transducing elements of the sensor to provide the sensor with sufficient capability to withstand the hazards of a space environment.

In a further embodiment of the instant invention, the solar sensor has been modified to eliminate the effects on the sensor of reflected solar radiation from nearby planetary bodies, such as the Earth. This is accomplished through the addition of a second or capturing sensor positioned concentrically about the inner or fine sensor discussed above. A switch-operating photocell is located within the inner or fine sensor. When the photocell operated switch is actuated by the incident radiation, the outer or capturing sensor is electrically disconnected from the bridge control circuit. The outer sensor then serves only to shield the inner or fine sensor from reflected radiation.

It has been found that if a satellite mission utilizing solar orientation requires prolonged pointing with reasonable accuracy, there must be provided a means to correct for photocell aging; i.e., the decrease in photocell output voltage that occurs with time. This decrease would result in a drift of the zero position of the sensor circuit, if the aging did not occur symmetrically for the cells. To compensate for this drift, a bright A.C. operated light is mounted on the forward end of the sensor. The light is then flashed evenly onto the inclined, silicon solar cells at widely separated time intervals, by reflecting the beam from a half-silvered mirror mounted in front of the flashing light. The A.C. component of the detected light signal due to any unbalance of the cell outputs, is then separated, amplified, and used to control servo-mechanically a potentiometer which changes the balance of the bridge circuit to its original zero position.

A more complete appreciation of the invention and many of the attendant advantages thereof will be readily apparent as the same becomes better understood by reference to the following detailed description when considered in connection with the accompanying drawings, wherein.

Figure 1:
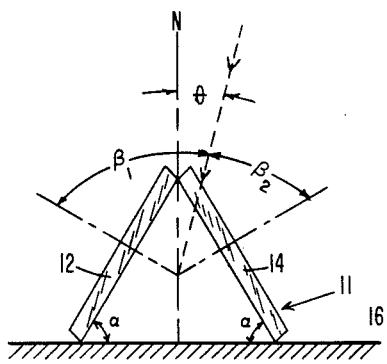
FIG. 1 is an elevational view of the solar sensor of the instant invention, illustrating its photometrical principle of operation.
Figure 2:
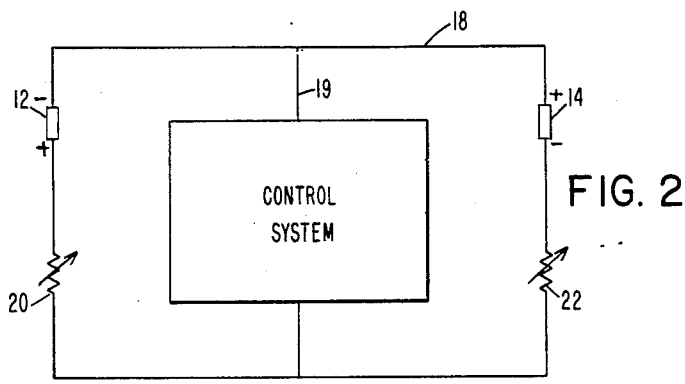
FIG. 2 is a diagram of the electrical circuit for the solar sensor of FIG. 1.

Referring now to the drawings, wherein like reference numerals designate identical or corresponding parts throughout the several views, the sensor 11 of the present invention is illustrated, FIGS. 1 and 2, as comprising a pair of planar transducing elements, photocells 12, 14, positioned on a sensor base 16 and inclined at equal oblique angles $\alpha$ thereto. The sensor reference axis N extends perpendicularly to base 16 and passes through the apex of cells 12, 14. $\theta$ designates the angle formed between axis N and an arbitrarily chosen direction of solar radiation. The basic operating principle of the sensor is that the illumination of a flat surface is directly proportional to the cosine of the angle of incidence $\beta$.

For the condition $$0<\theta<90°-\alpha$$

the illumination of cell 12 is given by $$I_{12}=I_{max}\cos\beta_1(\beta_1=\alpha+\theta)$$

and likewise for cell 14

$$I_{14}=I_{max}\cos\beta_2(\beta_2=\alpha-\theta)$$

where $I_{max}$ is the illumination of cell 14 when $$\theta=\alpha$$

It may be seen that for the case when the incident solar radiation is parallel to reference axis N, the case when $\theta=0$, the cells are equally illuminated and produce equal potentials if their electrical characteristics are matched.

When both cells are illuminated:

$$\Delta I=I_{max}[\cos(\alpha-\theta)-\cos(\alpha+\theta)](0<\theta<90°-\alpha)$$

when one cell is illuminated:

$$\Delta I=I_{max}\cos(\alpha-\theta)(90°-\alpha<\theta<90°+\alpha)$$

and when neither cell is illuminated:

$$\Delta I=0(\theta>90°+\alpha)$$

The cells are connected in a battery-bridge circuit, shown in FIG. 2. The circuit 18 includes balancing resistors 20 and 22 for initially matching the branch currents when the electrical characteristics of the photocells 12, 14 are not identical. These resistors 20, 22 may also be varied in magnitude so as to balance the current flow in the bridge circuit with the sensor pointed at any desired angle to the sun, instead of in alignment therewith.

When the reference axis N of the solar sensor is aligned towards the center of the solar disk, the photocells 12, 14 are equally illuminated and there will be no current flow through the center branch 19 of the battery-bridge circuit. It will be seen from FIG. 2 that the center branch 19 provides an input signal to the control system for a space vehicle. If, however, the incident radiation forms an angle $\theta$ with the sensor reference axis N, then the more illuminated of the photocells 12, 14 will produce an electrical signal through the center branch 19 of the bridge. This signal will increase in intensity with increasing error angle $\theta$ and will reach a maximum when the incident radiation becomes perpendicular to the more illuminated photocell. It should be noted that when $\theta$ reverses in sense, the signal to the vehicle control system similarly reverses polarity.

An important requirement for a solar sensor is that it be capable of reliable long-time operation in a space environment. Among the hazards likely to be encountered are severe particle and electromagnetic radiation, vacuum conditions, and micrometeor bombardment. An investigation of photosensitive devices leads to the selection of silicon solar cells as the photocells most capable of providing sustained, reliable operation in a space environment. There are several reasons for preferring silicon cells over other photosensitive devices, the most significant of which is the high ratio of electrical power output to incident solar power input. Silicon solar cells have been found to have a conversion efficiency of approximately 11%, which is superior to the efficiency of other usable converting devices. The silicon spectral response also compares very favorably to other known energy converting devices. This relatively high conversion ability serves to minimize the equipment required to process the sensor electrical signal; equipment which would introduce additional weight and failure possibility.

Silicon solar cells have proven capable of reliable operation in a space environment. This was shown by the first successful Vanguard Satellite, 1958 beta, whose photocells have operated for an extended period. In addition to this satellite experiment, laboratory tests on the effects of radiation upon silicon solar cells have been performed. The test cells were subjected to ultra-violet light, X-rays, gamma-rays, electrons, protons, and alpha particles, both in air and in vacuum. Based on existing knowledge of space radiation, the expected cell lifetime is many years. The lifetime of the cells may be further increased by providing protection means, such as windows of highly resistant fused silica, for the cells.

Figure 3:
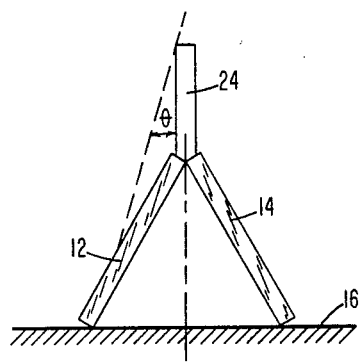
FIG. 3 is a view similar to FIG. 1, showing an embodiment of the invention wherein an opaque shield is incorporated in the sensor.

A significant gain in pointing sensitivity for the sensor of FIG. 1 can be realized through the addition of a shading or light shielding means, as shown in FIG. 3. An opaque shield 24 is disposed between photocells 12, 14 at the apex thereof, and extends along reference axis N. It may be seen, qualitatively at least, that the shadow cast by the shield 24 upon photocell 12 of FIG. 3 will cause a greater difference in illuminated photocell area than in the unshielded sensor, and therefore a larger sensor electrical output signal for small error angle $\theta$. It may be further noted that the addition of an opaque shield to the solar sensor, at the expense of a small increase in weight and bulk, does not reduce the wide angle capture capability of the sensor; thus providing in a single unit a sensor which has both wide angle capture capability and a high pointing sensitivity for small angles.

Figure 4:
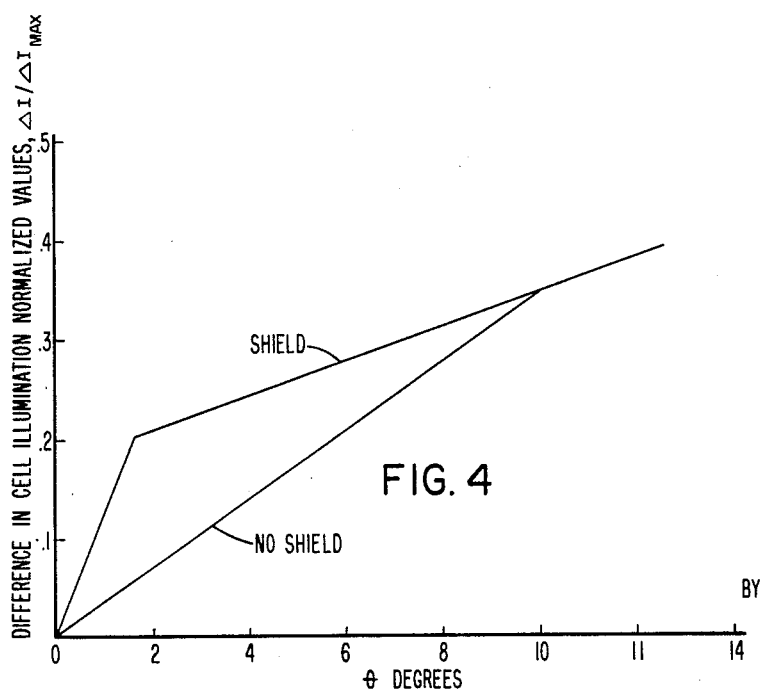
FIG. 4 is a graphical presentation illustrating the effects of a shield on the sensitivity of the sensor according to the instant invention.

The effect of adding a shield to the sensor of FIG. 1 is graphically illustrated in FIG. 4 wherein the error angle $\theta$ is plotted against the sensor output, or difference in cell illumination. The plotted values were derived from a sensor wherein the base angle $\alpha$ of the photocells was 80°; shield length equaled 5"; and the solar cells were 1" square. Referring to FIG. 4, it may be seen that for small error angles $\theta$ the shielded sensor has a much steeper slope then the unshielded, thereby giving a higher sensitivity for the small error angles.

Figure 5A:
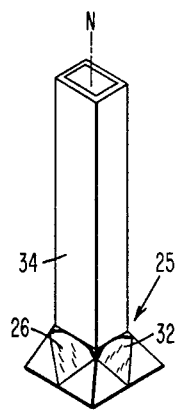
FIGS. 5a–5b illustrate, in perspective and plan view respectively, another embodiment of the instant invention wherein two-degree-of-freedom orientation is obtained.
Figure 5B:
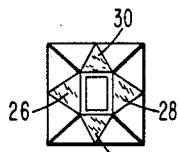

The sensors of FIGS. 1 and 3 described above are single-degree-of-freedom sensors. The embodiment of FIG. 5 illustrates a two-degree-of-freedom sensor in accordance wtih the instant invention. To obtain two-degree-of-freedom orientation, a second pair of photocells must be provided, the second set of cells being rotated orthogonally to the first set. The sensor 25, FIG. 5, comprises a first pair of planar photocells 26, 28, and a second pair of planar photocells 30, 32, rotated orthogonally thereto. The photocells 26, 28, 30, and 32 are of a triangular shape so as to produce a greater change of illuminated area per unit angular deviation of the incident radiation, and consequentially a greater sensor sensitivity. A four-sided shield member 34 extends parallel to the reference axis N of the sensor 25. The opposing photocell outputs of sensor 25 may be matched and compared in a bridge circuit, not shown, analogous to the electrical circuit of FIG. 2.

Since the sensor described in FIGS. 1 to 5 above is utilized for the dual purpose of initial capture and fine sensing, a probable cause of error which must be taken into consideration is that due to solar radiation reflected from other planetary bodies, such as the Earth. The solar sensor of the instant invention has an extremely wide field of view, and therefore is capable of viewing two light sources simultaneously. When this occurs, the sensor would tend to point the control system away from the reference source in the direction of the interfering source, the angular error being related to the angular separation of the two sources and their relative intensities.

Figure 6:
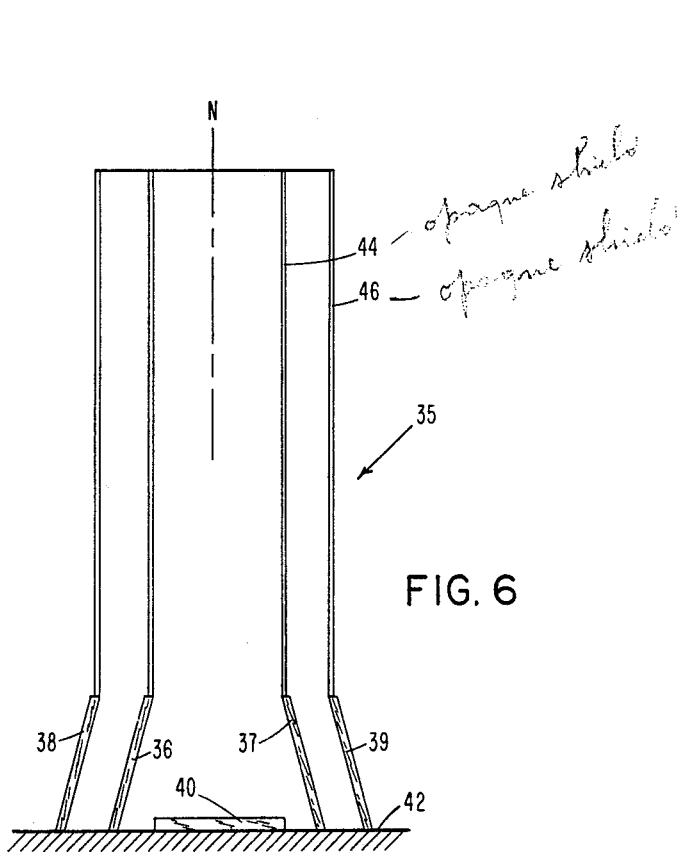
FIG. 6 illustrates schematically a two-level sensor according to the invention wherein the effects of reflected radiation may be eliminated.

In FIG. 6, a further embodiment of the solar sensor of the instant invention is shown wherein the effects of reflected solar radiation are eliminated. The two-level sensor 35, as shown in FIG. 6, includes an inner or pointing sensor unit comprised of cells 36, 37 positioned on sensor base 42, and inclined at a large angle thereto. An outer or capturing sensor unit comprised of cells 38, 39 is positioned concentrically about the inner sensor unit 36, 37, and is inclined at an equal angle to base 42. An inner sensitivity increasing opaque shield 44 extends parallel to the sensor axis N, and an outer opaque shield 46 for sensor unit 38, 39 is positioned concentrically thereabout. A photocell 40 is positioned within inner sensor unit 36, 37 on sensor base 42 for actuating switch means for selectively rendering the outer sensor unit 38, 39 inoperable, as will be discussed below. It will be noted that the inner and outer sensor units of the embodiment of FIG. 6 have been illustrated as comprising single pairs of cells 36-37, 38-39, for purposes of simplicity; however it is to be understood that these sensor units would preferably include second pairs of cells arranged in the manner of the two-degree-of-freedom sensor of FIG. 5 above.

Figure 7:
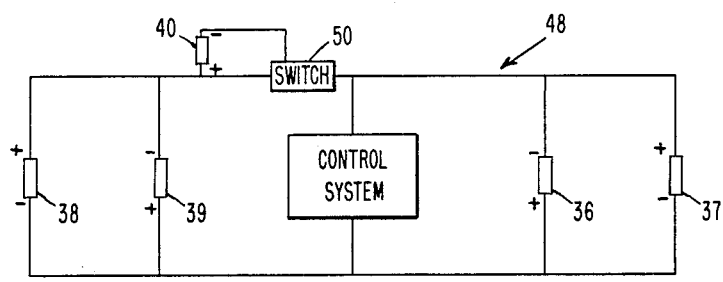
FIG. 7 is a diagram of the electrical circuit for the two-level sensor of FIG. 6.

The inner and outer sensor units are interconnected in an electrical circuit 48, as illustrated in FIG. 7. A switch 50, such as a switching transistor or a relay, is interposed in circuit 48 to electrically disconnect the outer or capturing sensor unit 38, 39 of the circuit when the incident radiation strikes the cell 40. Subsequently, the inner sensor unit 36, 37 solely operates the control system and the sensor 35 has no reflected radiation error, due to its restricted field of view; the now inoperative outer, capturing sensor unit 38, 39 serving only to shield the inner fine sensor unit 36, 37 from the effects of reflected radiation.

A further proposed method, not shown, for greatly reducing or eliminating the reflected sunlight error would be to decrease the sensitivity of the external sensor unit 38, 39 of FIG. 6, and to connect the inner and outer sensors in parallel. Once capture of the radiation source is attained, the interior sensor unit 36, 37 exerts a greater influence on the signal so that the reflected sunlight error is at least diminished.

Figure 8:
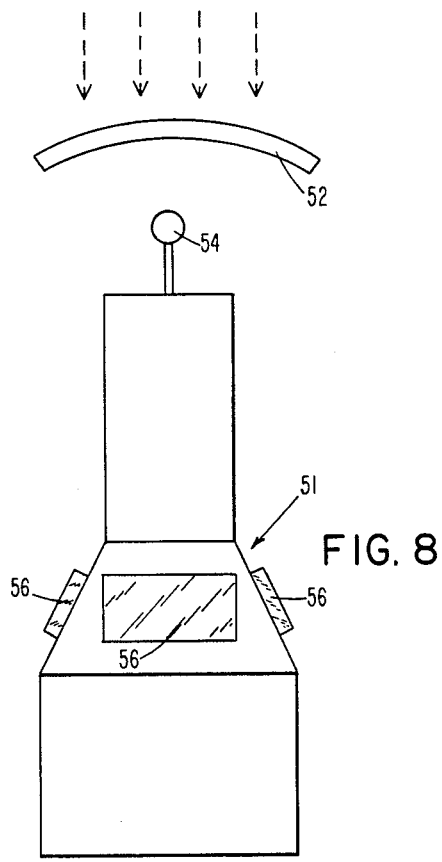
FIG. 8 is a schematic view of the sensor of the instant invention combined with a drift compensator.

If a space mission employing the sensor of the instant invention requires prolonged pointing with reasonable accuracy, there should be provided a means to correct for photocell aging, which is the decrease in cell output voltage that occurs with time. This decrease would result in a drift of the zero position of the sensor bridge circuit if the aging did not occur symmetrically for the paired cells. A system for compensating for the drift, when this becomes necessary, is shown schematically in FIGS. 8 and 9.

The system comprises a bright A.C. operated light 54, mounted on the upper end of the sensor 51, and a half-silvered mirror 52 mounted in front of the light to reflect a flashing light beam evenly onto all of the photocells 56 at widely separated time intervals. The A.C. component of the detected light beam, due to any unbalance of the cell output, can then be separated, amplified, and used to servo-mechanically control a potentiometer 58 to change the balance of the bridge circuit to its original zero position.

Figure 9:
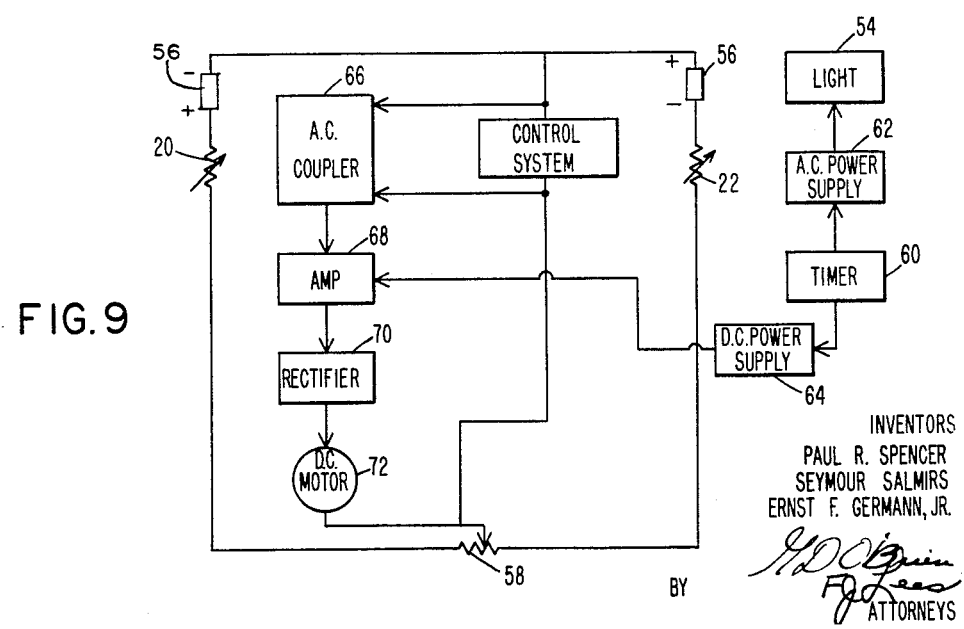
FIG. 9 is a block diagram of the drift compensator circuit of the invention.

FIG. 9 illustrates in block diagram the compensating circuit for each pair of cells 56 and includes: a timer 60 for actuating the light power supply 62 and the amplifier power supply 64, a coupler 66 for separating out the A.C. signal component due to cell unbalance, an amplifier 68, a rectifier 70, and a D.C. motor 72 for positioning potentiometer 58 to restore the original circuit balance. As described above with respect to FIG. 2, resistors 20, 22 serve to initially match the photocell outputs to balance the bridge circuit.

In operation of the drift corrector, it is anticipated that the light 54 may be required to flash for only one second of time at weekly intervals, at a frequency of approximately 800 cycles per second. Although this method of drift compensation introduces moving parts which could invite system failure, should the compensator fail for some unforeseen reason, it would remain on its last setting, thereby causing no greater total error than would result from asymmetrical cell aging after failure of the compensator.

As a result of the instant invention, it is evident that a radiation direction detector having a minimum of delicate or moving parts has been provided, combining both a wide angle capture capability and a high pointing sensitivity into a single unit. Further, in other aspects of the invention, the adverse effects on the solar sensor of reflected solar radiation, and of asymmetrical photocell aging, have been largely eliminated.

Although the radiation direction detector of the instant invention has been described with reference to its use as a solar sensor, the principle of operation of the detector may also be used to detect the direction of other sources of electro-magnetic radiation, whether in the infrared, visible, or ultraviolet regions of the spectrum. Further, in addition to its previously described role in space technology, commercial uses of the instant invention might include orientation of solar cookers, furnaces, and other terrestrial devices which collect solar radiation for conversion to electricity or heat.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A solar sensor having a reference axis for orienting the sensor with respect to the solar disk comprising: a first plurality of planar photocells inclined at equal angles about the sensor reference axis for detecting incident radiation; a second plurality of planar photocells inclined at equal angles about the sensor reference axis for detecting incident radiation; said second plurality of photocells being spaced outwardly of and positioned concentrically about said first plurality of photocells and serving to shield said first plurality of photocells from the effects of solar radiation reflected from other planetary bodies; and electrical circuit means interconnecting said first and second plurality of photocells for providing an electrical signal proportional to the angle formed between incident radiation from the solar disk and the sensor reference axis.

2. A solar sensor as defined in claim 1, and wherein said electrical circuit means further includes a switch for electrically disconnecting said second plurality of photocells therefrom.

3. A solar sensor as defined in claim 2, and including an additional photocell positioned on said reference axis within said first plurality of planar photocells, said additional photocell actuating said switch when said solar radiation is incident thereon.

4. A solar sensor having a reference axis for orienting the sensor with respect to the solar disk comprising in combination: a plurality of planar photocells inclined at equal angles about the sensor reference axis for detecting incident radiation; an electrical circuit including a balancing potentiometer interconnecting said plurality of photocells for providing an electrical signal proportional to the angle formed between incident radiation from the solar disk and said reference axis; and drift compensating means for correcting for asymmetrical photocell aging including an A.C. operated light source mounted on said sensor along said sensor axis, a half-silvered mirror mounted on said sensor for reflecting light from said light source evenly onto all of said photocells, means for actuating said light source at widely separated time intervals, means for separating the A.C. component due to unbalance of individual photocell outputs, and means for applying a correctional signal to said balancing potentiometer corresponding to said A.C. component, thereby restoring said circuit to a balanced position.

5. A radiation direction detector having a reference axis for orienting the detector with respect to a radiation source comprising: a plurality of planar photocells disposed about and inclined at equal oblique angles to the detector reference axis for detecting incident radiation, the apex of said inclined photocells pointing along said axis in the direction of said radiation source; shield means positioned at the apex of said inclined photocells and extending parallel to said detector reference axis for casting a shadow on certain of said photocells when said incident radiation is not parallel to said reference axis, thereby increasing the photocell illumination difference and the detector sensitivity for small angles of incidence; and an electrical circuit interconnecting said plurality of photocells for providing an electrical signal proportional to the angle formed between incident radiation from the radiation source and said detector reference axis.

6. A radiation direction detector as defined in claim 5, wherein said plurality of planar photocells consists of two pairs of photocells, one pair of photocells being rotated orthogonally to the other.

References Cited by the Examiner

UNITED STATES PATENTS

| | | | |
|---|---|---|---|
| 2,155,402 | 4/1939 | Clark | 250—203 X |
| 2,447,344 | 8/1948 | Kliever | 250—203 X |
| 2,489,221 | 11/1949 | Herbold | 250—211 X |
| 2,573,729 | 11/1951 | Rath | 250—212 X |
| 2,766,387 | 10/1956 | Bolsey | 250—203 |
| 2,828,930 | 4/1958 | Herbold | 250—210 X |
| 2,913,583 | 11/1959 | Regnier et al. | 250—203 |
| 2,949,498 | 8/1960 | Jackson | 200—211 X |
| 3,026,439 | 3/1962 | Geer | 250—212 |
| 3,050,631 | 8/1962 | Bourguignon | 250—203 |
| 3,078,372 | 2/1963 | Chase et al. | 250—203 |
| 3,084,261 | 4/1963 | Wilson | 250—203 |
| 3,098,934 | 7/1963 | Wilson et al. | 250—203 |
| 3,162,764 | 12/1964 | Haviland | 250—203 X |
| 3,171,963 | 3/1965 | Bourguignon | 250—212 X |

RALPH G. NILSON, *Primary Examiner.*

ARCHIE R. BORCHELT, *Examiner.*

ELROY STRICKLAND, MICHAEL A. LEAVITT,
*Assistant Examiners.*